United States Patent [19]
Hochuli

[11] 3,899,751

[45] Aug. 12, 1975

[54] LONG LIFE MOLECULAR GAS LASER

[76] Inventor: Urs E. Hochuli, 7011 S. Wark Ter., Hyattsville, Md. 20782

[22] Filed: Dec. 3, 1973

[21] Appl. No.: 421,135

[52] U.S. Cl. .................. 331/94.5 T; 331/94.5 G
[51] Int. Cl.² ............................................ H01S 3/00
[58] Field of Search ... 331/94.5 PE, 94.5 T, 94.5 G; 313/218, 221, 223, 224

[56] References Cited
UNITED STATES PATENTS

| | | | |
|---|---|---|---|
| 2,864,024 | 12/1958 | Ahsmann | 313/218 |
| 3,529,262 | 9/1970 | Witteman | 313/218 |
| 3,743,881 | 7/1973 | Blaszuk | 313/218 |
| 3,784,928 | 1/1974 | Crane | 313/218 |

*Primary Examiner*—Alfred E. Smith
*Assistant Examiner*—Michael J. Tokar

[57] ABSTRACT

A cold cathode molecular gas laser in which the molecular dissociation at the cathode surface leading to gas depletion through formation of scaling layers and successive sputtering is counteracted by the choice of a cathode material whose scaling layers can be reduced in an atmosphere that is still compatible with laser action is described. Furthermore, among the cathode materials so selected the ones that form or are doped to form semiconducting scaling layers can support higher cathode current densities at lower sputtering rates than the ones that form insulating layers of scale. The selection of cathode materials from the first groups of the periodic table leads to a minimum of negative ions in the sputtering products. Deposits stay therefore confined near the cathode and do no harm to laser windows and mirrors. As an example, sealed off $CO_2$ lasers that have lifetimes in excess of 10,000 hours with cold cathodes selected according to these principles have been constructed.

14 Claims, 3 Drawing Figures

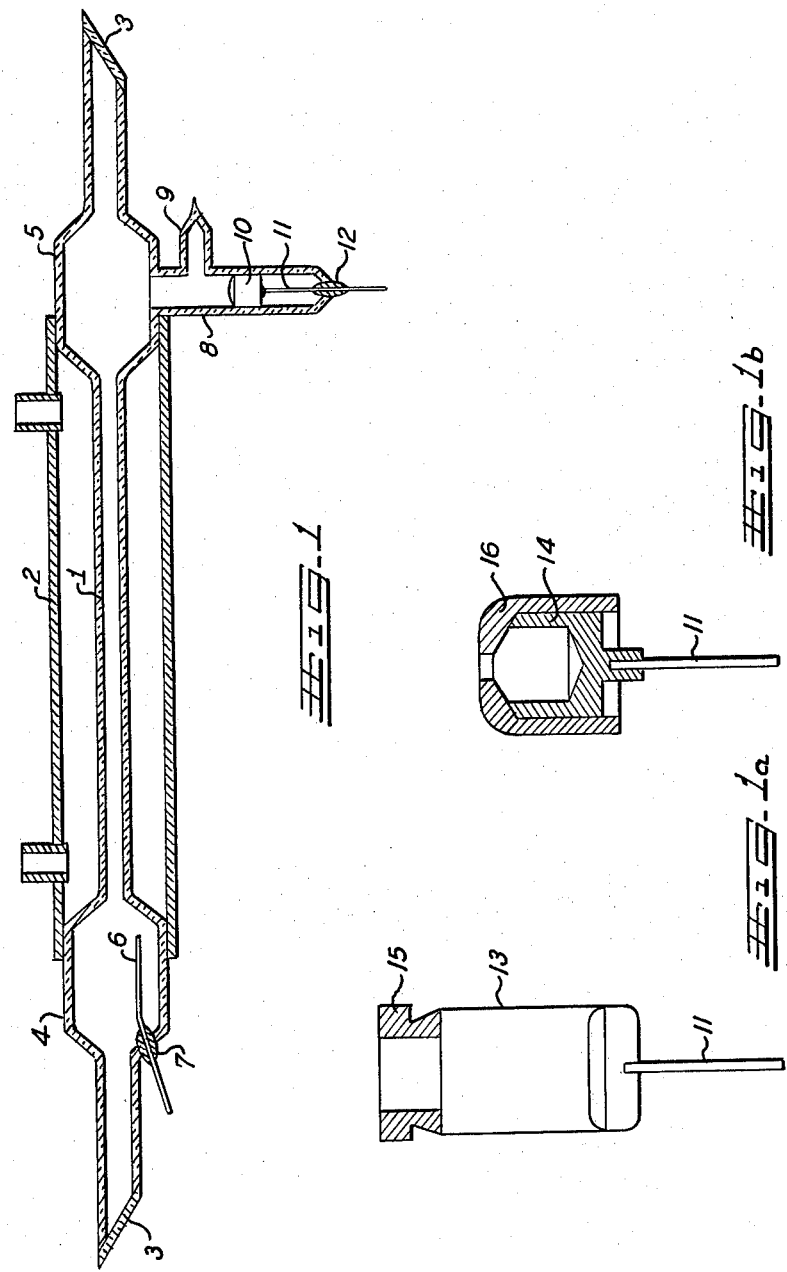

LONG LIFE MOLECULAR GAS LASER

This application includes material disclosed in a paper entitled, "Cold Cathodes for Sealed Off $CO_2$ Lasers" dated January 1973, as a progress report for NASA grants NGR 21-002-216 and NGR 21-002-345 by the inventor thereof. A royalty free license is hereby granted to the United States for use of the invention for all government purposes.

BACKGROUND AND BRIEF DESCRIPTION OF THE INVENTION

This invention relates to long life cold cathodes for molecular gas lasers. Many different cold cathodes for gas discharge devices using molecular gasses have been described in the literature, see for example Barclay U.S. Pat. No. 2,062,959. None of these prior art gas discharge devices had to meet such critical constraints as laser gain tubes have to satisfy. Copper cathodes have been used in noble gas lasers, see for example Witte et al U.S. Pat. No. 3,688,217. However, molecular gas lasers require specific gas mixtures whose specific composition must be maintained over the life of the laser. A typical prior art $CO_2$ laser gas mixture for instance uses 15 parts He, 7 parts $CO_2$, 7 parts $N_2$, 1.5 parts Xe. Quite often there is a certain amount of flexibility. It was also known (but rarely used) that for the $CO_2$ laser it is permissible to replace the $N_2$ with an equal amount of CO and small amounts of $H_2$, or $H_2O$ can be added.

The main life shortening factor for the $CO_2$ laser is the depletion of $CO_2$ through the dissociation reaction $2CO_2 \rightleftharpoons O_2 + 2CO$. This reaction takes mainly place at the cathode where the oxygen is then used to form oxide layers. The formation of such scaling layers can be counteracted if a cathode material which can be reduced in the particular laser gas mixture is used. The suitable class of cathode materials for the $CO_2$ laser comprises all the metal oxides with a larger oxygen dissociation pressure than the one of the $CO_2$ dissociation reaction. These are the metal oxides that can be reduced in the He $CO_2$CoXe gas mixture. See FIGS. 29 and/or 30 of NASA Technical Note TN-D7307, June 1973 which is incorporated herein by reference in its entirety.

The normal current density J at the cold cathode surface obeys a law of the form $J/p^2 = $ constant, where $p$ is the gas pressure and the constant depends somewhat on the gas mixture and cathode surface used. Increased gas pressures lead to current densities that cannot be supported by insulating layers of scale at the cathode surface. From Ohms law $J = \delta E$ it is seen that the electric field E that leads to heating and local breakdown can be reduced by choosing cathode surfaces that form layers of scale with good electrical conductivity $\delta$. For intrinsic semiconducting layers of scale the conductivity can be further enhanced by increasing the cathode temperature. This can easily be achieved through thermal insulation of the cathode sleeve. In order to prevent harmful deposits on laser windows and internal mirrors it is highly desirable to use cathode materials that produce a minimum of negative ions in their sputtering products. These materials are located in the first groups of the periodic table and usually easily lose one electron. Materials in the last groups of the periodic table can gain electrons and be attracted to the positive anode and, therefore, use of these materials in lasers constructed according to this invention should be avoided. However, if transverse electric fields are used to deflect these ions from their travel to the windows or mirrors, even those materials may be used.

For the $CO_2$ laser it is found that silver, copper and their alloys satisfy the requirements of this invention if used in $HeCO_2COXe$ gas mixtures. Among the silver-copper alloy cathodes an internally oxidized 95 percent silver 5 percent copper cathode is of particular interest. Such cathodes contain CuO molecules in a silver matrix and cannot be oxidized any further. Cathodes made from alloys containing originally more than 5 percent copper give actually oxygen off through reduction of CuO to $Cu_2O$. The oxygen subsequently oxidizes CO to $CO_2$ thus increasing the partial $CO_2$ pressure and reducing the partial CO pressure. Among the internally oxidized silver copper alloys in the range 100 percent Ag to 80 percent Ag 20 percent Cu tested, the 95 percent Ag 5 percent Cu Alloy showed the smallest sputtering rate. Cathode current densities for the $CO_2$ laser are of the order of 9 to 18 mA per square cm for gas pressures of the order of 20 Torr. Cathodes from these materials allow the construction of sealed off $CO_2$ lasers with life times in excess of 10,000 hours. These cathodes are not successful in nitrogen containing laser gas mixtures, such as $HeCO_2N_2Xe$ gas mixtures. However, platinum-copper alloy cathodes permit the use of the nitrogen containing gas mixture in accordance with this invention if small amounts of hydrogen or water vapor are added. These additions help to reduce the platinum oxides through the water vapor cycle.

DESCRIPTION OF THE DRAWINGS

The above and other objects, advantages and features of this invention will become more apparent from the following description, taken in conjunction with the accompanying drawings wherein:

FIG. 1 is a cross sectional view of a gas laser incorporating the invention and

FIGS. 1a and 1b are cross sections of typical cathode constructions as used in the invention.

DESCRIPTION OF A PREFERRED EMBODIMENT OF THE INVENTION

Referring to FIG. 1 a conventional laser tube consisting of a standard bore 1 made from Pyrex, Be O etc., surrounded by a cooling jacket 2, and Brewster window ends 3. These windows may be sealed to the tube body in the manner taught in my application Ser. No. 60,401 filed on Aug. 3, 1970. The enlarged sections 4 and 5 hold the cooling jacket in place and serve as a small gas reservoir. Section 4 holds the anode 6 made from platinum, gold, silver, copper, etc. leading through the envelope using a graded seal 7. The anode materials should be selected to be reducible according to the principles of this invention. The cathode side arm 8 with evacuation stem 9 connects to section 5 and holds the cathode assembly 10. The cathode connection 11 enters the side arm 8 through a graded seal 12. The laser tube design shown in no way limits the invention from being incorporated in waveguide laser tubes or tubes of coaxial design with or without internal mirrors or transversely excited lasers all of which are well known in the art.

FIGS. 1a and 1b show exploded views of the cathode assembly 10. In both figures the cathodes 13 and 14 are protected by standard sputter shields 15 and 16 and connected to leads 11. Cathode 14 is machined from a solid rod of internally oxidized 95 percent silver, 5 percent copper alloy and cathode 13 may be fabricated from sheet stock of the same material.

What is claimed is:

1. In a $CO_2$ gas laser having means forming an elongated gas filled bore, an anode and a cold cathode for laser excitation of the gas in said bore, the improvements for extending the life of said gas laser comprising a reducing gas mixture compatible with laser action in combination with a cold cathode material whose discharge created scale can be reduced over a substantially short time interval by said gas mixture to minimize layers of scale matter on the cold cathode and in the sputtering products thus maintaining the partial pressures of the gas mixture components over a period of time of at least 10,000 hours.

2. The laser defined in claim 1 wherein the cathode material is selected to achieve semiconducting layers of scale.

3. The laser defined in claim 1 wherein the cathode material is selected to be one that forms a minimum of negative ions in its sputtering products.

4. The laser defined in claim 1 wherein said cathode includes copper and elements selected from the group I and group II of the periodic table and said bore is filled with a reducing gas mixture comprising He, $CO_2$, CO, and Xe.

5. The laser defined in claim 1 wherein the cathode includes silver and elements selected from group I and group II of the periodic table and said laser bore is filled with a reducing gas mixture comprising He, $CO_2$, CO, and Xe.

6. The laser defined in claim 5 wherein said cathode consists of an internally oxidized silver - copper alloy with 70 percent to 97 percent silver content (by weight).

7. The invention defined in claim 1 wherein said cathode includes platinum-copper alloys varying from about 70 percent Pt-30 percent Cu to about 50 percent Pt — 50 percent CU (by weight) and said reducing gas mixture is selected from the group comprising He, $CO_2$, $N_2$, $H_2$, and Xe and He, $CO_2$, $N_2$, $H_2O$, and Xe.

8. In a gas laser having means forming an elongated bore and laser end pieces at the ends of said bore, a laser gas mixture in said bore, and an anode and a cold cathode for inducing laser action in said laser gas mixture, said laser gas mixture being selected from the groups comprising He, $CO_2$, $N_2$ and He, $CO_2$, CO, the improvement comprising a cathode material selected from an element of groups I and II of the periodic table and reducible in the laser gas mixture to maintain the composition ratios of said gas mixture stable over a period of time of at least 10,000 hours.

9. The laser defined in claim 8 wherein said cathode material includes copper.

10. The laser defined in claim 9 wherein said cathode material includes silver alloyed with said copper wherein said copper is internally oxidized.

11. The laser defined in claim 9 wherein said gas mixture is He, $CO_2$, CO, and Xe.

12. The laser defined in claim 10 wherein said gas mixture is He, $CO_2$, CO and Xe.

13. In a gas laser having means forming an elongated bore and laser end pieces at the ends of said bore, a laser gas mixture in said bore, and an anode and a cold cathode for inducing laser action in said laser gas mixture, said laser gas mixture being selected from the groups comprising He, $CO_2$, $N_2$ and He, $CO_2$, CO, the improvement comprising a cathode material selected from elements in groups VII and VIII of the periodic table and reducible in the laser gas mixture to maintain the composition ratios of said gas mixture stable over a period of time of at least 10,000 hours and an electric field component transverse to said elongated bore to deflect ions from travel to the laser end pieces.

14. The laser defined in claim 8 including operative amounts of one or more of Xe, $H_2$, and $H_2O$.

* * * * *